United States Patent [19]
Matzinger et al.

[11] Patent Number: 6,001,904
[45] Date of Patent: Dec. 14, 1999

[54] SHEAR-THINNING PHASE CHANGE INK JET INKS AND METHOD OF PRINTING THEREWITH

[75] Inventors: Michael D. Matzinger, Mt. Pleasant; Robert P. Rodebaugh, Goose Creek, both of S.C.

[73] Assignee: Westvaco Corporation, New York, N.Y.

[21] Appl. No.: 09/074,760

[22] Filed: May 8, 1998

[51] Int. Cl.$^6$ .............................. C09D 11/12; C09D 11/02
[52] U.S. Cl. .................. 524/31; 524/32; 524/33; 524/35; 524/36; 524/37; 524/38; 524/39; 524/40; 524/41; 524/42; 524/43; 524/55; 524/72; 524/74; 524/76; 524/77; 524/78; 106/31.13; 106/31.24; 106/31.25; 106/31.27; 106/31.28; 106/31.29; 106/31.36; 106/31.37; 106/31.38; 106/31.4; 106/31.41
[58] Field of Search ................................ 524/31, 32, 33, 524/35, 36, 37, 38, 39, 40, 41, 42, 43, 55, 72, 74, 76, 77, 78; 1036/31.13, 31.24, 31.25, 31.27, 31.28, 31.29, 31.36, 31.37, 31.38, 31.4, 31.41

[56] References Cited

U.S. PATENT DOCUMENTS 5,385,957  1/1995  Tobias et al. ............................ 523/161
5,429,860  7/1995  Held et al. ............................... 428/195
5,693,128  12/1997  Sacripante et al. .................. 106/31.27

*Primary Examiner*—Nathan M. Nutter
*Attorney, Agent, or Firm*—Terry B. McDaniel; Daniel B. Reece, IV; Richard L. Schmalz

[57] ABSTRACT

Phase change (hot melt) ink compositions for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties are disclosed to comprise:

(a) from about 0.1% to about 30% of one or more colorants; and (b) from about 0.1 to about 99.9% of one or more reversibly-crosslinked-polymers.

Components other than those listed above may be included in the ink compositions to achieve specific printer, substrate, or end use requirements. Furthermore, the present invention also includes methods for the preparation of reversibly-crosslinked-polymers and for their use in the above-described inks.

37 Claims, No Drawings

SHEAR-THINNING PHASE CHANGE INK JET INKS AND METHOD OF PRINTING THEREWITH

BACKGROUND OF THE INVENTION

1. Field of the Invention

This invention relates to ink jet inks for use in ink jet printers. More particularly, this invention relates to phase change, or hot melt, ink jet inks for use in ink jet printers from which ink is propelled from the printer nozzle by heat or by a pressure wave.

2. Description of Related Art (Including Information Disclosed Under 37 CFR 1.97 and 37 CFR 1.98)

Ink jet printing involves the placement in response to a digital signal of small drops of a fluid ink onto a surface to form an image without physical contact between the printing device and the surface. The method of drop generation varies among the different ink jet technologies and can be used to classify ink jet printing into two major technology types, continuous (CIJ) and drop-on-demand (DOD).

In CIJ printing systems, a continuous stream of liquid ink droplets is ejected from a nozzle and is directed, with the assistance of an electrostatic charging device in close proximity to the print head, either to a substrate to form a printed image or to a recirculating system. Inks for CIJ printing systems are typically based on solvents such as methyl ethyl ketone and ethanol.

In DOD ink jet printing systems, liquid ink droplets are propelled from a nozzle by heat (thermal or bubble ink jet) or by a pressure wave (piezo ink jet). Unlike CIJ systems, all the ink droplets are used to form the printed image and are ejected when needed, "on demand." No deflection of ink droplets is involved. Thermal or bubble ink jet inks typically are based on water and glycols. Piezo ink jet systems generally use aqueous, solvent, or solid inks. These last inks, also known as phase change inks, are solid at ambient temperature and liquid at printing temperatures. It is these inks to which the present invention relates.

The following properties are required of an ink composition for ink jet printing:

(a) high quality printing (edge acuity and optical density) of text and graphics on substrates, in particular, on uncoated cellulosic paper, (b) short dry time of the ink on a substrate and good adhesion such that after printing the print is not smudged when rubbed or offset onto a subsequent printed image placed upon the print, (c) good jetting properties exhibited by a lack of deviation of ink droplets from the flight path (misplaced dots) and of ink starvation during conditions of high ink demand (missing dots), (d) resistance of the ink after drying on a substrate to water and to solvents, (e) long-term storage stability (no pigment settling) and (f) long-term reliability (no corrosion or nozzle clogging).

Inks are known that possess one or more of the above listed properties. However, few inks are known that possess all of the above listed properties. Often, the inclusion of an ink component meant to satisfy one of the above requirements can prevent another requirement from being met. For example, the inclusion of a polymer in the ink composition can improve the adhesion of the ink to the substrate. However, the polymer can impair the jetting of the ink because of the behavior of the polymer under the high shear conditions of jetting ($10^4$–$10^6$ sec$^{-3}$). Thus, most commercial ink jet inks represent a compromise in an attempt to achieve at least an adequate response in meeting all of the above listed requirements.

The use of polymers in phase change (hot melt) inks and the printing of such inks has been disclosed in the following publications:

U.S. Pat. No. 5,006,170 teaches the use of "rosin esters" with a colorant and a propellant.

U.S. Pat. No. 5,531,819 teaches the use of an "acrylic resin," "rosin resin," "hydrogenated rosin resin," "petroleum resin," "hydrogenated petroleum resin," or "terpene resin" with a wax, a colorant, and a plasticizer.

U.S. Pat. No. 5,354,368 discloses the use of a "tall oil rosin having a high acid number" with a rheology modifier. Given as examples of "tall oil rosin" are "natural tall oil and wood rosins as well as modified tall oil and wood rosins and tall oil and wood rosin derivatives."

U.S. Pat. No. 5,397,388 teaches the use of "acrylic resin," "rosin resin," "petroleum resin," "modified petroleum resin," "hydrogenated petroleum resin," or "terpene resin," with a wax, an organic substance miscible with the wax, and a colorant.

U.S. Pat. No. 5,409,530 teaches the use of a resin selected from the group consisting of "rosins, rosin derivatives, terpenes, [or] modified terpenes . . . " with a second component to dissolve the resin.

U.S. Pat. No. 5,514,209 discloses the use of a "glycerol ester of a hydrogenated rosin" with a microcrystalline wax.

U.S. Pat. No. 5,620,508 teaches the use of "rosin-type resins" with pigments and oil-soluble dyes. Given as examples of rosin-type resins are "rosins, hydrogenated rosins, disproportionated rosins, rosin esters, rosin-modified phenolic resins, rosin-modified maleic acid resins, and rosin-modified xylene resins.

Also, EP 0 739 958 A2 teaches the use of an "acrylic resin," rosin resin," "petroleum resin," "modified petroleum resin," "hydrogenated petroleum resin," or "terpene resin," with at least one wax, a colorant, and a second resin. One resin has a softening point from room temperature to 100° C., and the other resin has a softening point from 50–150° C.

While the prior art teaches the use of many classes of polymers in phase change (hot melt) inks, no report has been made of the use of crosslinked polymers that decrease in viscosity with increasing shear rate in phase change inks. The essential component of the present invention is a crosslinked polymer that is crosslinked in such a fashion that the links are broken under shear but are reformed at rest. The novel aspect of using a crosslinked polymer in a phase change (hot melt) ink is that the viscosity of the ink will decrease during the jetting operation but then increase when placed upon the substrate. Thus, the jetting properties are improved without diminution of the printing properties. In accordance with the present invention, the preparation of phase change (hot melt) inks useful in ink jet printing devices is provided. The phase change (hot melt) inks preferably are for use in a piezo ink jet printer with which recording is conducted by thermally melting an ink composition at a temperature above ambient temperature (20° C.) and then ejecting the ink composition onto a porous or non-porous substrate such as paper, aluminum, glass, metal, wood, synthetic polymer films, and textiles. Furthermore, the present invention also provides methods for the preparation of crosslinked polymers and for their use in the above-described inks.

The present invention overcomes many of the problems associated with the use of prior art phase change (hot melt) ink compositions while achieving distinct advantages thereof. Accordingly, an object of the present invention is to provide improved ink compositions capable of satisfying simultaneously the properties required of an ink composition for ink jet printing, especially the aforementioned properties (a) to (f) and which comprise a reversibly-crosslinked-polymer that prevents the corrosion to metal components of an ink jet printer often caused by acid-functionalized or acidic polymers in a hot melt ink jet ink. Other objects and advantages of the present invention will become apparent from the following disclosure.

SUMMARY OF THE INVENTION

In accordance with the present invention, the preparation of phase change (hot melt) inks useful in ink jet, hot melt gravure, and similar printing devices is provided. The phase change (hot melt) inks preferably are for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties (including corrosion resistance). Furthermore, the present invention also includes methods for the preparation of reversibly-crosslinked-polymers and for their use in the above-described inks.

In accordance with the present invention, the ink compositions comprise:

(a) from about 0.1% to about 30% of one or more colorants; and (b) from about 0.1 to about 99.9% of one or more reversibly-crosslinked-polymers. Components other than those listed above may be included in the ink compositions to achieve specific printer, substrate, or end use requirements.

DESCRIPTION OF THE PREFERRED EMBODIMENT(S)

The phase change (hot melt) inks of the present invention comprise a colorant and a reversibly-crosslinked-polymer. Other components that may be added, include but are not limited to, waxes, polymers, antioxidants, biocides, and corrosion inhibitors.

Colorants

Coloring agents that may be incorporated in the ink composition include pigments and dyes. Any dye or pigment or combination of one or more dyes or pigments may be used as long as the colorant can be dispersed in the ink composition and is compatible with the other components of the composition. The coloring material of the present invention is preferably a pigment.

No particular limitation is imposed on the type or the amount of pigment used. The term "pigment" refers to a solvent insoluble colorant. A large range of pigments, organic and inorganic, may be used either alone or in combination. Pigments used in ink jet inks typically are in the dispersed state and are kept from agglomerating and settling out of the carrier medium by placing acidic or basic functional groups on the surface of the pigments, attaching a polymer onto the surface of the pigments, or adding a surfactant to the ink.

The amount of the pigment present in the ink compositions is from about 0.1 to 30 wt %, preferably from about 2 to 10 wt %. Examples of a pigment that may be used in the practice of the present invention for a yellow ink include C.I. Pigment Yellow 1, C.I. Pigment Yellow 3, and C.I. Pigment Yellow 13. Examples of a pigment that may be used in the present invention for a magenta ink include C.I. Pigment Red 5, C.I. Pigment Red 7, C.I. Pigment Red 12, C.I. Pigment Red 112, and C.I. Pigment Red 122. Examples of a pigment that may be used in the present invention for a cyan ink include C.I. Pigment Blue 1, C.I. Pigment Blue 2, C.I. Pigment Blue 16, C.I. Vat Blue 4, and C.I. Vat Blue 6.

The pigment particles need to be small enough in size so that they move freely through the printing device. Because the ejecting nozzles of ink jet ink printers range in diameter from about 10 to 100 microns, pigments suitable for use in the present invention may have a range of particle sizes from about 0.01 microns to 100 microns, preferably from about 0.01 microns to 10 microns, and more preferably from about 0.01 microns to 5 microns.

No particular limitation is imposed on the type or the amount of dye used. Dyes which are useful in the present invention are those which are water soluble or water-insoluble such as basic, acid, and direct dyes. If desired, the dyes can be reactive dyes which contain groups capable of forming covalent bonds with textile materials. The amount of dye present in the ink compositions is from about 0.1 to 30 wt %, preferably from about 2 to 10 wt %.

Fine particles of metal or metal oxides also may be included as colorants for the compositions of the present invention. Metal and metal oxides are used in the preparation of magnetic ink jet inks. Examples may include silica, alumina, titania, and finely divided copper.

Reversibly-Crosslinked-Polymers

The essential component of the present invention is a reversibly-crosslinked-polymer. This polymer is prepared by chemically attaching a crosslinker to a polymer that possesses one or more of one or more types of functional groups capable of reacting reversibly with the crosslinker. The novel aspect of using a reversibly-crosslinked-polymer in a phase change (hot melt) ink is that it allows for a significant amount of polymer to be used to bind the colorant to the substrate without degrading the quality of the printed image. Such polymers for phase change (hot melt) inks are unknown. Reversibly-crosslinked-polymers can be used as the sole polymer of the ink formulation or in combination with other polymers.

The polymers suitable for use in the present inventions may include naturally occurring polymers such as alginic acid, carboxymethyl cellulose, and pectinic acid; synthetic analogues of naturally occurring polymers such as rosin esters, lignosulfanates, nitrocellulose, and alcohol-soluble polysaccharides; synthetic polymers such as polyacrylamide, polyacrylic acid, polyethylene oxide, polyethylene glycol, polymethacrylic acid, polyitaconic acid, polymaleic acid, polyvinyl alcohol, and polyvinyl methyl ether; and synthetic copolymers such as styrene/acrylic acid, ethylene/vinyl acetate, acrylic acid/N-vinyl pyrrolidinone, and vinylnaphthalene/itaconate copolymers. The copolymers may be block, graft, tapered, branched, and random copolymers. Methods of polymerization include solution, emulsion, suspension, and bulk polymerization. While physical properties of the polymers can be affected by the polymerization method, the resultant polymers can provide the desired outcomes of the invention.

No particular limitation is imposed on the physical properties of the polymers. Preferred polymers are those having an acid number in the range of from about 10 to 300, a weight average molecular weight in the range of from about 500 to 250,000, a softening point in the range of from about 0 to 150° C., and a glass transition temperature of in the range of from about −25 to 180° C. More preferred polymers are those having an acid number in the range of from about 20 to 80, a weight average molecular weight in the range of from about 2000 to 35,000, a softening point in the range of from about 40 to 90° C., and a glass transition temperature from about 25 to 80° C.

No particular limitation is imposed on the type of crosslinking agent used. The crosslinking agents suitable in the present invention may include organic or inorganic reagents based on metals, non-metals, and metalloids. A crosslinking agent may consist of any reagent which could be used to covalently or noncovalently link reactive functional groups in a polymer or other reagents such as a wax, plasticizer, solvent or pigment. No limitation is placed on the type of reactive functional groups interacting with the crosslinking agent. These reactive functionalities may include alcohols, alkenes, alkynes, aldehydes, amines, azides, aziridines, carboxylic acids, epoxides, nitrites, phenols, phosphates, phosphites, phosphines, and the like. The amount of crosslinking agent present in the ink compositions is from about 0.01 to 30% based on the weight of the gelled polymer, preferably from about 0.2 to 10%.

Suitable organometallic reagents for use as crosslinkers in the present invention include metallic soaps such as aluminum octoate, aluminum palmitate, aluminum stearate, aluminum distearate, aluminum tristearate, barium stearate, calcium stearate, lead stearate, magnesium stearate, zinc palmitate, and zinc stearate; oxyaluminum acylates such as oxyaluminum octoate and oxyaluminum stearate; alkoxy aluminum chelates such as diisobutyl(oleyl)acetoacetyl aluminate and diisopropyl(oleyl)acetoacetyl aluminate; other aluminum reagents such as Ketalin® and CycoGel® (Chattem Chemicals); alkoxy titanates such as titanium (IV) ethoxide, titanium (IV) butoxide, and titanium (IV) isoproxide; monoalkoxy titanates such as isopropyl triisostearoyl titanate and isopropyl tri(dodecyl)benzenesulfonyl titanate; chelated titanium agents such as di(cumyl)phenyl oxoethylene titanate and di(butyl, methyl)pyrophosphato ethylene titanate; amine adducts of titanates such as KR® 138D and KR® 238J (Kenrich Petrochemicals, Inc.); coordinate titanates such as tetraisopropyldi(dioctyl)phosphito titanate; alkoxy zirconates such as zirconium (IV) butoxide; neoalkoxy zirconates such as dineopentyldiallyl)oxy neopentyl(diallyl)oxy trineodecanoyl zirconate and neopentyl(diallyl)oxy tri(dodecyl)benzene-sulfonyl zirconate; and cycloheteroatom zirconates such as cyclo(dioctyl) pyrophosphato dioctyl zirconate and cyclo[(dineopentyl (diallyl)]pyrophosphato dineopentyl(diallyl) zirconate.

Other alkoxy reagents, chelated reagents, and metallocene reagents based on the above metals or based on elements such as antimony, copper, galium, germanium, indium, iron, lanthanum, manganese, nickel, niobium, selenium, tin, thallium, and zinc may also be suitable for the present inventions. Silicon based coupling agents such as silanes and siloxanes are also suitable for use in the present inventions.

Waxes

Any one of known waxes may be used in the phase change (hot melt) ink formulation with no particular restriction. A preferred wax is solid at room temperature and is molten sufficiently at the operating temperature of the printing device. Examples of suitable waxes include petroleum waxes, such as paraffin wax and micro crystalline wax; plant waxes, such candelilla wax and carnauba wax; animal waxes, such as bees wax and lanolin; synthetic hydrocarbon waxes, such as a Fisher-Tropsch wax and a polyethylene wax; higher fatty acids, such as stearic acid and lauric acid; higher alcohols, such as stearyl alcohol and 12-hydroxystearic acid; and derivatives thereof and combinations thereof. These waxes may be used alone in the ink formulation or admixed with one or more other waxes.

Polymers

Polymers used in phase change (hot melt) inks of the present invention generally have melting points in the range of about 40° C. to 200° C., and preferably from about 60° C. to 140° C. The polymer should be thermally stable in a molten state so that gaseous products are not generated or deposits on the printer device are not formed.

Examples of suitable polymers for ink compositions of the present invention include, but are not limited to, one or more of the following: alkyd resins; amides; acrylic polymers; benzoate esters; citrate plasticizers; cumarone-indene resins; dimer fatty acids; epoxy resins; fatty acids; ketone resins; maleate plasticizers; long chain alcohols; olefin resins; petroleum resins; phenolic resins; phthalate plasticizers; polyesters; polyvinyl alcohol resins; rosins; styrene resins; sulfones; sulfonamides; terpene resins; urethanes; vinyl resins; and derivatives thereof and combinations thereof. No limitation is placed on the type or the amount of the polymer that is present in the ink.

Antioxidants

Phase change (hot melt) ink compositions prepared in accordance with the present invention are in a molten state during printing. To prevent thermally induced oxidation from occurring in this state, antioxidants may be added to the ink composition. Suitable antioxidants, present preferably in the amount of about 0.1% to 1.0% by weight of the ink composition, include, for example, Irganox® 1010 (Ciba-Geigy Corp.).

Biocides

To prevent the growth of microorganisms, a biocide may be added, preferably in the range of about 0.01% to 5%, based on the weight of the ink composition. Examples of suitable biocides include sorbic acid, vinylenebis-thiocyanate, bis(trichloromethyl)sulfone, and zinc pyridinethione.

Corrosion Inhibitors

One or more corrosion inhibitors may be added to inhibit the corrosion of the metal that comes in contact with the phase change (hot melt) ink. Suitable corrosion inhibitors, present preferably in the range of about 0.1% to 5% (based on the weight of the ink composition), include ammonium dinonyl naphthalene sulphonate.

Methods of Ink Preparation and Desired Ink Properties

No limitation is placed on the way in which the components of the phase change (hot melt) ink compositions of the present invention are combined in the preparation of the compositions. A preferred method involves heating the components, excluding the pigment, while slowly stirring, until a homogenous mixture is obtained. Then, the pigment is added and stirring and heating are continued until a homogenous mixture is obtained. If a greater degree of dispersion is desired, a dispersing machine such as a three roll mill, an attritor, a ball mill, or a colloid mill can be used. The molten mixture is then filtered to remove particles of a size too large for effective printing.

Inks suitable for use with phase change (hot melt) ink jet printers should be solid at room temperature, by which is meant about 18° C. to about 27° C., and are transformed into a molten state at temperatures ranging from 45° C. to 150° C. Most preferably these inks should melt from about 65° C. to 130° C. The phase change inks also should exhibit a relatively low melt viscosity of 1 to 50 cP between 100° C. and 150° C., most preferably 5 to 20 cP. The inks also should exhibit excellent dispersion and stability of this dispersion, especially when exposed to the elevated temperatures at which the ink is commonly stored and jetted in the printing device. The ink compositions of the present invention meet the aforementioned requirements.

Inks suitable for use with hot melt (phase change) ink jet printers should provide prints with excellent quality (good edge acuity and high optical density), and there should be no missing or misplaced dots. The inks should dry quickly onto the printed substrate as well as adhere well to said substrate to provide a print with resistance to abrasion, water, and solvents. The ink compositions of the present invention meet these requirements.

Inks suitable for use with phase change (hot melt) ink jet printers should possess desirable corrosion inhibition properties. The components of a phase change ink should not cause corrosion to the materials which compose the printing device. Thus, the inks should not cause corrosion to parts such as the printhead, which are made from metals such as electrodeposited nickel. The present ink compositions are not corrosive to these materials, since corrosion-causing functionalities such as carboxylic acids are effectively protected through crosslinking agents.

The ink compositions of the present invention possess desirable non-Newtonian properties. That is, these inks exhibit a relatively high viscosity at relatively low shear rates, e.g., 12 cP or more, but a much reduced viscosity at relatively high shear rates, e.g., $10^4$ sec$^{-1}$ or more. The high viscosity at low shear helps to keep the colorant in suspension when the ink is being stored whereas the low viscosity at high shear reduces the energy required to eject the ink droplet from the printhead.

Methods of Printing

The compositions of the present invention may be used in phase change (hot melt) ink jet, hot melt gravure, and similar printing methods. A preferred method of printing involves phase change (hot melt) ink jet printing using piezo ink jet printers. The specific ink jet printer employed is not critical.

Substrates

No limitation is placed on the substrate that can be used in the practice of the present invention. The compositions of this invention can be applied to a wide range of porous and non-porous substrates such as paper, aluminum, glass, metal, wood, synthetic polymer films, and textiles. The temperature of the substrate can be adjusted to improve properties such as print quality and adhesion. For example, the substrate can be passed through heated rollers subsequent to printing to improve print quality by increasing dot gain. Also, the temperature of the ink ejected from the printer can be raised so that when it comes into contact with a compliant substrate, such as plastic, enhanced adhesion can occur due to partial fusing.

Specific embodiments of the phase change (hot melt) inks of the present invention are provided in further detail herein below. These examples are intended to be illustrative, and the invention is not limited to the materials set forth in these embodiments. All parts are by weight unless otherwise noted.

EXAMPLE 1

To a three-liter, five-neck, round-bottom flask, equipped with an agitator shaft and blade, thermocouple, condenser, and two stoppers, 1000 parts of Rosin SS (Westvaco Corp.) was charged. The Rosin SS was heated to 185 ° C. to melt the rosin. Then, 57.6 parts of maleic anhydride (Aldrich Chemical Co.) was added, and the temperature was increased to 205° C. After 1 hour at this temperature, 175 parts of stearic acid (Aldrich Chemical Co.), 92 parts of glycerol (Aldrich Chemical Co.), and 92 parts of pentaerythritol (Aldrich Chemical Co.) were added. A Dean-Stark trap was inserted between the round-bottom flask and the condenser. The contents of the flask were heated to 265° C. over one hour. The temperature was held at 265° C. for three hours, then 150 parts of a styrene acrylic polymer, JON-REZ® H-2704 (Westvaco Corp.), was added, and the temperature was maintained for an additional 1.5 hours. The reaction was sparged with nitrogen for one hour to remove water and reaction oils. The resulting polymer had an acid number of 22, a ring and ball softening point of 75° C., and a Brookfield viscosity of 1580 cP at 135° C.

EXAMPLE 2

The following components were mixed in a three-gallon plastic container: 3190 parts dicyclopentadiene (Lyondell Chemical Corp.), 1021 parts LRO-90 (Lyondell Chemical Corp.), and 294 parts of Neodene® 16 (Shell Chemical Co.). Then, the contents of the plastic container and 507.4 parts stearic acid (Aldrich Chemical Co.) were charged to a two-gallon Parr reactor. The mixture was heated to 110° C. and then was sparged with nitrogen for thirty minutes. The nitrogen was then turned off, the reactor was sealed, and the mixture was heated to 260° C. The temperature was held at 260° C. for five hours. The temperature was then cooled to 140° C., and the reactor was vented to atmospheric pressure. The contents of the Parr reactor were transferred to a five-liter, five-neck, round bottom flask equipped with an agitator shaft and blade, thermocouple, nitrogen sparge tube, condenser and Dean-Stark trap, and stopper. The contents of the flask were heated to 220° C. and sparged with nitrogen for approximately five hours. The resulting polymer had an acid number of 1.9, a ring and ball softening point of 50° C., and a Brookfield viscosity of 455 cP at 130° C.

EXAMPLE 3

To a two-liter, five-neck, round bottom flask equipped with an agitator shaft and blade, thermocouple, condenser, nitrogen sparge tube and stopper, 250 parts Rosin SS (Westvaco Corp.) and 700 parts of the polymer described in Example 2 were charged. The contents were heated to 180° C. under a nitrogen blanket and agitation was begun once the contents were molten. Then, 14.4 parts maleic anhydride (Aldrich Chemical Co.) and 44 parts stearic acid (Aldrich Chemical Co.) were added, and the temperature was increased to 205° C. After 1.5 hours, 16.8 parts pentaerythritol (Aldrich Chemical Co.) and 31.6 parts glycerol (Aldrich Chemical Co.) were added. A Dean-Stark trap was inserted between the round-bottom flask and the condenser. The contents of the flask were then heated to 265° C. over one hour. The temperature was held at 265° C. for three hours and then the contents were sparged with nitrogen for one hour. The resulting polymer had an acid number of 9.3, a ring and ball softening point of 76° C., a Brookfield viscosity of 192 cP at 135° C.

EXAMPLE 4

To a three-liter, five-neck, round bottom flask equipped with an agitator shaft and blade, thermocouple, condenser, nitrogen sparge tube and a stopper, 1200 parts Rosin SS (Westvaco Corp.) was charged. The contents were heated to 180° C. under a nitrogen blanket and agitation was begun once the contents were molten. Then, 69.1 parts maleic anhydride (Aldrich Chemical Co.) and 200 parts stearic acid (Aldrich Chemical Co.) were added and the temperature was increased to 205° C. After one hour at this temperature, 110 parts pentaerythritol (Aldrich Chemical Co.), 110 parts glycerol (Aldrich Chemical Co.), and 1.9 parts magnesium oxide (Aldrich Chemical Co.) were added. A Dean-Stark trap was inserted between the round-bottom flask and the condenser. The contents of the flask then were heated to 265° C. over one hour. The temperature was held at 265° C. for three hours and then the contents were sparged with nitrogen for one hour. The resulting polymer had an acid number of 17, a ring and ball softening point of 70° C., a weight average molecular weight of 1910 daltons, a polydispersity of 2.2, a DSC glass transition temperature of 18° C., and a Brookfield viscosity of 1380 cP at 130° C.

EXAMPLE 5

To a three-liter, five-neck, round bottom flask equipped with an agitator shaft and blade, thermocouple, condenser, nitrogen sparge tube and a stopper, 900 parts Rosin SS (Westvaco Corp.) was charged. The rosin was then heated to 180° C. under a nitrogen blanket and agitation was begun once the rosin was molten. Then, 51.8 parts maleic anhydride (Aldrich Chemical Co.) and 300 parts stearic acid (Aldrich Chemical Co.) were added and the temperature was increased to 205° C. After one hour at this temperature, 92 parts pentaerytritol (Aldrich Chemical Co.) and 92 parts glycerol (Aldrich Chemical Co.) were added. A Dean-Stark trap was inserted between the round-bottom flask and the condenser. The contents of the flask then were heated to 265° C. over one hour. The temperature was held at 265° C. for three hours and then the contents were sparged with nitrogen for one hour. The resulting polymer has an acid number of 21, a ring and ball softening point of 43° C., a Brookfield viscosity of 208 cP at 130° C.

EXAMPLE 6

To a two-liter, five-neck, round bottom flask equipped with an agitator shaft and blade, condenser and Dean-Stark trap, thermocouple, nitrogen sparge tube and a stopper, 175 parts dimethylphthalate (Aldrich Chemical Co.), 100 parts glycerol (Aldrich Chemical Co.), and 340 parts stearic acid (Aldrich Chemical Co.) were added. The contents were then heated to 180° C. under a nitrogen black and agitation was begun once the contents were molten. Then, the temperature was increased to 220° C. and water and methanol produced during the reaction were collected. After forty-five minutes, the temperature was increased to 250° C. and held for five hours. The contents were then sparged with nitrogen for one hour. The resulting polymer had a Brookfield viscosity at of 6 cP at 130° C., a weight average molecular weight of 960 daltons, and a polydispersity of 1.2.

EXAMPLE 7

To a three-liter, five-neck, round bottom flask equipped with an agitator shaft and blade, condenser and Dean-Stark trap, thermocouple, nitrogen sparge tube and a stopper, 600 parts Rosin SS (Westvaco Corp.) was added. The contents were then heated to 180° C. and agitation was begun once the contents were molten. Then, 568 parts stearic acid (Aldrich Chemical Co.) and 166.14 parts ethylene glycol (Aldrich Chemical Co.) were added and the temperature was increased to 190° C. and held for 90 minutes. The temperature was increased to 265° C. over one hour and held for three hours. The contents were then sparged with nitrogen for one hour. The resulting polymer had an acid number of 14, and a Brookfield viscosity of 8.8 cP at 130° C.

EXAMPLE 8

To a 250-ml, three-neck, round bottom flask equipped with an agitator shaft and blade, thermocouple, nitrogen sparge tube, and a condenser, 30 parts of the polymer described in Example 1 and 30 parts montan wax (Frank B. Ross, Inc.) were charged. The contents were heated to 180° C. (at 100° C., slow agitation was begun). The contents were held at 180° C. until the mixture was homogenous. The temperature was decreased to 160° C. and the agitation was increased until a vortex was present. Based on the total weight of the mixture, 1.5% of a 1:1 mixture of oxyaluminum octoate (Chattem Chemical Co.)/alkaline refined linseed oil (Elf Atochem) was added, and the contents were stirred for forty-five minutes. Another 1% of the 1:1 mixture was added, and the contents were stirred for an additional forty-five minute period. The resulting composition had a Brookfield viscosity of 265 cP at 130° C.

EXAMPLE 9

To a 250-ml, three-neck, round bottom flask equipped with an agitator shaft and blade, thermocouple, nitrogen sparge tube, and a condenser, 30 parts of the polymer described in Example 1 and 30 parts 18-pentatriacontanone (TCI) were charged. The contents were heated to 180° C. (at 100° C., slow agitation was begun). The contents were held at 180° C. until the mixture was homogenous. The temperature was decreased to 160° C. and the agitation was increased until a vortex was present. Based on the total weight of the mixture, 1.5% of a 1:1 mixture of oxyaluminum octoate (Chattem Chemical Co.)/18-pentatriacontanone (TCI) was added, and the contents were stirred for forty-five minutes. Another 2% of the 1:1 mixture was added, and the contents were stirred for an additional forty-five minute period. The resulting composition had a Brookfield viscosity of 67 cP at 130° C.

EXAMPLE 10

To a 250-ml, three-neck, round bottom flask equipped with an agitator shaft and blade, thermocouple, nitrogen sparge tube, and a condenser, 60 parts of the polymer described in Example 5 and 60 parts alkaline refined linseed oil (Elf Atochem) were charged. The contents were then heated to 180° C. (at 100° C., a slow agitation was begun). The contents were held at 180° C. until the mixture was homogenous. The temperature was decreased to 115° C. and the agitation was increased until a vortex was present. Based on the total weight of the mixture, 0.5% of zirconium(IV) butoxide (Aldrich Chemical Co.) was added, and the contents were stirred for thirty minutes. Another 3.5% of the zirconium reagent was added, and the contents were stirred for an additional thirty minute period. The temperature was increased to 170° C. and the contents were stirred for one hour. The resulting polymer had a Laray viscosity of 1.95 sec at 30° C.

EXAMPLE 11

To a 250-ml, three-neck, round bottom flask equipped with an agitator shaft and blade, thermocouple, nitrogen sparge tube, and a condenser, 30 parts of the polymer described in Example 4 and 30 parts castor wax (Amber Inc.) were charged. The contents were heated to 180° C. (at 100° C., a slow agitation was begun). The contents were held at 180° C. until the mixture was homogenous. The temperature was decreased to 130° C. and the agitation was increased until a vortex was present. Based on the total weight of the mixture, 1.5% of KR-TTS® (isopropyl triisostearoyl titanate supplied by Kenrich Petrochemicals, Inc.) was added, and the contents were stirred for six hours. The resulting polymer had a Brookfield viscosity of 45 cP at 130° C.

EXAMPLE 12

To a 250-ml, three-neck, round bottom flask equipped with an agitator shaft and blade, thermocouple, nitrogen sparge tube, and a condenser, 40 parts of the polymer described in Example 3 and 30 parts montan wax (Frank B. Ross, Inc.) were charged. The contents were heated to 180° C. (at 100° C., a slow agitation was begun). The contents were held at 180° C. until all the resin was in solution. The temperature was decreased to 160° C. and the agitation was increased until a vortex was present. Based on the total weight of the mixture, 1.5% of a 1:1 oxyaluminum octoate (Chattem Chemical Co.)/alkaline refined linseed oil (Elf Atochem) mixture was added, and stirred for forty-five minutes. Another 0.75% of the 1:1 mixture was added, and the contents were then stirred for six hours. The resulting polymer had a Brookfield viscosity of 76 cP at 130° C.

EXAMPLE 13

To a 250-ml, three-neck, round bottom flask equipped with an agitator shaft and blade, thermocouple, nitrogen sparge tube, and a condenser, 40 parts castor wax (Amber, Inc.) was charged. The contents were heated to 160° C. The agitation was increased until a vortex was present. Then, 2% of oxyaluminum octoate (Chattem Chemical Co.) was added, and stirred for six hours. The resulting polymer had a Brookfield viscosity of 19.5 cP at 130° C.

EXAMPLE 14

The following components were heated while stirring until a homogenous mixture was obtained: 50 parts of the composition described in Example 9, 28 parts 18-pentatriacontanone (TCI), and 20 parts Unilin 350 (saturated, long-chain, linear alcohol supplied by Baker Petrolite). To this mixture, 2 parts Monolite® Blue 3R (Zeneca, Inc.) was added, and stirring was continued until a homogenous mixture was obtained. The pigment was further dispersed by passing the ink composition through a three roll mill (Charles Ross and Son) five times.

EXAMPLE 15

The following components were heated while stirring until a homogenous mixture was obtained: 20 parts of the composition described in Example 12, 40 parts montan wax (Frank B. Ross, Inc.), 15 parts of the polymer described in Example 7, 7.1 parts 18-pentatriacontanone (TCI), 14.1 parts Uniplex 260 (glycerol tribenzoate supplied by Unitex Chemical Co.), and 1.8 parts tributyl phosphate (Aldrich Chemical Co.). Then, 2.1 parts Sunfast® Magenta 122 (Sun Chemical Co.) was added, and stirring was continued until a homogeneous mixture was obtained. The pigment was further dispersed by passing the ink composition through a three roll mill (Charles Ross and Son) five times.

EXAMPLE 16

The following components were heated while stirring until a homogeneous mixture was obtained: 30 parts of the composition described in Example 11, 32 parts montan wax (Frank B. Ross, Inc.), 9.4 parts 1 8-pentatriacontanone (TCI), 18.8 parts Uniplex 260 (glyceryl tribenzoate supplied by Unitex Chemical Co.), 5 parts dimethyl phthalate (Aldrich Chemical Co.) and 2.3 parts tributyl phosphate (Aldrich Chemical Co.). Then, 2.8 parts Sunfast® Magenta 122 (Sun Chemical Co.) was added, and stirring was continued until a homogeneous mixture was obtained. The pigment was further dispersed by passing the ink composition through a three roll mill (Charles Ross and Son) five times.

EXAMPLE 17

The following components were heated while stirring until a homogeneous mixture was obtained: 20 parts of the composition described in Example 13, 40 parts of montan wax (Frank B. Ross, Inc.), 15 parts of the polymer described in Example 7, 7.1 parts 18-pentatriacatanone (TCI), 14.1 parts Uniplex 260 (glycerol tribenzoate supplied by Unitex Chemical Co.), and 1.8 parts tributyl phosphate (Aldrich Chemical Co.). Then, 2.1 parts Sunfast® Magenta 122 (Sun Chemical Co.) was added, and stirring was continued until a homogeneous mixture was obtained. The pigment was further dispersed by passing the ink composition through a three roll mill (Charles Ross and Son) five times.

EXAMPLE 18

The following components were heated while stirring until a homogeneous mixture was obtained: 25 parts of the composition described in Example 8, 45 parts montan wax (Frank B. Ross, Inc.), 7.1 parts 18-pentatriacontanone (TCI), 14.1 parts Uniplex 260 (glycerol tribenzoate supplied by Unitex Chemical Co.), and 6.8 parts tributyl phosphate (Aldrich Chemical Co.). Then, 2.1 parts Sunfast® Magenta 122 (Sun Chemical Co.) was added, and stirring was continued until a homogenous mixture was obtained. The pigment was further dispersed by passing the ink composition through a three roll mill (Charles Ross and Son) five times.

EXAMPLE 19

The following components were heated while stirring until a homogeneous mixture was obtained: 20.2 parts of the composition described in Example 8, 30.4 parts of the polymer described in Example 6, 32.5 parts 18-pentatriacontanone (TCI), and 15.5 parts of the polymer described in Example 7. Then, 1.4 parts Sunfast® Yellow 83 (Sun Chemical Co.) was added, and stirring was continued until a homogeneous mixture was obtained. The pigment was further dispersed by passing the ink composition through a three roll mill (Charles Ross and Son) five times.

EXAMPLE 20

The following components were heated while stirring until a homogeneous mixture was obtained: 23 parts of the polymer described in Example 1, 55 parts 18-pentatriacontanone (TCI), and 20 parts Unilin 350 (saturated, long-chain, linear alcohol supplied by Baker Petrolite). Then, 2 parts Monolite® Blue 3R (Zeneca, Inc.) was added, and stirring was continued until a homogenous mixture was obtained. The pigment was further dispersed by passing the ink composition through a three roll mill (Charles Ross and Son) five times.

EXAMPLE 21

The following components were heated while stirring until a homogeneous mixture was obtained: 60 parts Montan wax, 15 parts of the polymer described in Example 7, 7.1 parts 18-pentatriacontanone (TCI), 14.1 parts Uniplex 260 (glyceryl tribenzoate supplied by Unitex Chemical Co.), and 1.8 parts tributyl phosphate (Aldrich Chemical Co.). Then, 2.1 parts Sunfast® Magenta 122 (Sun Chemical Co.) was added, and stirring was continued until a homogenous mixture was obtained. The pigment was further dispersed by passing the ink composition through a three roll mill (Charles Ross and Son) five times.

EXAMPLE 22

The following properties of the ink compositions described in Examples 14–21 were evaluated: Brookfield viscosity, pigment dispersion stability, pigment dispersion, and print quality.

All Brookfield viscosities were conducted using a Brookfield DV-I+ viscometer interfaced with a thermocell device which was set at 130° C. Spindle #18 was used to determine the viscosities of the polymers and the inks.

Pigment dispersion stability was examined by placing a glass vial that contained 8–10 grams of the ink into an oven at 105° C. for 72 hours and monitoring the ink for any phase separation or pigment agglomeration.

Pigment dispersion was evaluated by melting a drop of the ink, after roll milling, on a glass microscope slide. The sample was examined using an Olympus CO11 microscope (100X and 400X), noting the presence or absence of pigment agglomeration.

A portion of molten ink was drawn down on standard office paper (3 mil) using a multi clearance applicator (BYK Gardner). The print was then examined for color, tack, and adhesion to the paper substrate. The results are shown in Table I.

TABLE I

| Example # | Brookfield Viscosity (cP) | Pigment Dispersion Stability | Pigment Dispersion* | Print Quality* Color | Print Quality* Adhesion | Print Quality* Tack |
|---|---|---|---|---|---|---|
| 14 | 14.0 | >72 hrs | 10 | 8 | 10 | 10 |
| 15 | 22.0 | >72 hrs | 10 | 10 | 10 | 9 |
| 16 | 35.8 | >72 hrs | 10 | 10 | 10 | 9 |
| 17 | 20.3 | >72 hrs | 9 | 9 | 10 | 10 |
| 18 | 27.0 | >72 hrs | 10 | 9 | 10 | 10 |
| 19 | 39.0 | >72 hrs | 9 | 10 | 10 | 7 |
| 20 | 8.7 | 8 hrs | 8 | 7 | 10 | 10 |
| 21 | 17.5 | >1 hr | 3 | 5 | 8 | 10 |

*Pigment dispersion and Print Quality rating system: 10 = excellent → 1 = poor

These data show that in ink formulations employing a reversibly-crosslinked-polymer, such as Examples 14–19, generally as good or better color, adhesion, and tack were achieved, but with significant improvements in pigment dispersion and dispersion stability, as compared with ink formulations without a polymer which is reversibly-crosslinked, such as Examples 20 and 21.

EXAMPLE 23

The complex viscosity of the ink compositions described in Examples 14–21 was evaluated using a Rheometrics Dynamic Rheometer with 40 mm parallel plates (gap width—0.4 mm). The complex viscosity was determined at increasing oscillatory frequencies, the stress was maintained at 500 dynes/cm$^2$, and the temperature was kept constant. The results are shown in Table II.

TABLE II

| | Complex Viscosity (P) at Various Frequencies | | | | | | |
|---|---|---|---|---|---|---|---|
| Example | 0.1 rad/s | 0.4 rad/s | 1.0 rad/s | 10 rad/s | 100 rad/s | 251.2 rad/s | % Chg.[4] |
| 14[1] | 198 | 148 | 121 | 51 | 18 | 16 | 92 |
| 15[2] | 1128 | 770 | 737 | 534 | 167 | 101 | 91 |
| 16[2] | 768 | 493 | 325 | 107 | 33 | 23 | 97 |
| 17[2] | 252 | 27 | 23 | 17 | 10 | 9 | 96 |
| 18[2] | 3256 | 2003 | 1878 | 1295 | 382 | 186 | 94 |
| 19[3] | 79252 | 7669 | 3298 | 877 | 297 | 216 | 99 |
| 20[1] | 70 | 34 | 32 | 23 | 10 | 10 | 86 |
| 21[2] | 2068 | 1028 | 904 | 831 | 750 | 653 | 68 |

[1]Viscosities determined at 80° C.
[2]Viscosities determined at 75° C.
[3]Viscosities determined at 65° C.
[4]% Change represents the percent change in the complex viscosity between readings at 0.1 rad/s and 251.2 rad/s.

These data show that in ink formulations employing a reversibly-crosslinked-polymer, such as Examples 14–19, much enhanced % changes in complex viscosities were achieved, as compared with ink formulations without a polymer which is reversibly-crosslinked, such as Examples 20 and 21.

From this disclosure it should be understood that the subject matter of this invention is:

(1) An ink jet ink composition comprising a colorant and a reversibly-crosslinked-polymer;

(2) the ink jet ink composition of (1) wherein the composition is a phase change ink jet ink;

(3) the ink jet ink composition of (2) wherein the colorant is a member of the group of colorants selected from pigments, dyes, metals, metal oxides, and combinations thereof;

(4) The ink jet ink composition of (3) wherein the pigment is selected from the group of organic and inorganic water-insoluble colorants and combinations thereof;

(5) the ink jet ink composition of (4) wherein the pigment is selected from the group of pigments consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, and C.I. Vat Blue 6;

(6) the ink jet ink composition of (5) wherein the pigment is present in an amount of from about 0.1 to about 30 wt % and is characterized by a particle size of from about 0.1 to about 100 microns in diameter;

(7) the ink jet ink composition of (6) wherein the pigment is present in an amount of from about 2 to about 10 wt % and is characterized by a particle size of from about 0.01 to about 10 microns in diameter;

(8) the ink jet ink composition of (7) wherein the pigment is characterized by a particle size from about 0.01 to about 5 microns in diameter;

(9) the ink jet ink composition of (3) wherein the dye is selected from the group of dyes consisting of basic, acid, and direct dyes;

(10) the ink jet ink compositions of (3) wherein the dye is a reactive dye;

(11) the ink jet ink composition of (3) wherein the dye is present in an amount of from about 0.1 to about 30 wt %;

(12) The ink jet ink composition of (11) wherein the dye is present in an amount of from about 2 to about 10 wt %;

(13) the ink jet ink composition of (3) wherein the metals and metal oxides are selected from the group consisting of silica, alumina, titania, and finely divided copper;

(14) the ink jet ink composition of (2) wherein the reversibly-crosslinked-polymer is characterized by a polymer having chemically attached thereto a crosslinking agent and wherein the polymer possesses one or more functional groups capable of reacting reversibly with the crosslinking agent;

(15) the ink jet ink composition of (14) wherein the reversibly-crosslinked-polymer is present in an amount to provide an amount of the attached crosslinking agent from about 0.01% to about 30%, based on the weight of the polymer in gel form and wherein the polymer is characterized by an acid number from about 10 to about 300, a weight average molecular weight from about 500 to about 250,000, a softening point from about 0 to about 150° C., and a glass transition temperature from about −25 to 180° C.;

(16) the ink jet ink composition of (15) wherein the polymer is characterized by an acid number from about 20 to about 80, a weight average molecular weight from about 2,000 to about 35,000, a softening point from about 40 to 90° C., and a glass transition temperature from about 25 to about 80° C.;

(17) the ink jet ink composition of (14) wherein the polymer is selected from the group of naturally occurring polymers, synthetic analogues of naturally occurring polymers, synthetic polymers, and synthetic copolymers;

(18) the ink jet ink composition of (17) wherein the naturally occurring polymer is selected from the group of polymers consisting of alginic acid, carboxymethyl cellulose, and pectinic acid;

(19) the ink jet ink composition of (17) wherein the synthetic analogues of naturally occurring polymers is selected from the group of polymers consisting of rosin esters, lignosulfanates, nitrocellulose, and alcohol-soluble polysaccharides;

(20) the ink jet ink composition of (17) wherein the synthetic polymer is selected from the group of polymers consisting of polyacrylamide, polyacrylic acid, polyethylene oxide, polyethylene glycol, polymethacrylic acid, polyitaconic acid, polymaleic acid, polyvinyl alcohol, and polyvinyl methyl ether;

(21) the ink jet ink composition of (17) wherein the synthetic copolymer is selected from the group of polymers consisting of styrene/acrylic acid, ethylene/vinyl acetate, acrylic acid/N-vinyl pyrrolidinone, and vinylnaphthalene/itaconate copolymers;

(22) the ink jet ink composition of (17) wherein the reversibly-crosslinked-polymer is prepared by a polymerization method selected from the group consisting of solution polymerization, emulsion polymerization, suspension polymerization, and bulk polymerization;

(23) the ink jet ink composition of (14) wherein the crosslinking agent is selected from the group of reagents selected from organic reagents and inorganic reagents and wherein the reagents are based on a member of the group consisting of metals, non-metals, and metalloids;

(24) the ink jet ink composition of (23) wherein the organic reagents are selected from the group of organometallic reagents consisting of metallic soaps, oxyaluminum acylates, alkoxy aluminum chelates, alkoxy titanates, monoalkoxy titanates, chelated titanium agents, amine adducts of titanates, coordinate titanates, alkoxy zirconates, neoalkoxy zirconates, and cycloheteroatom zirconates;

(25) the ink jet ink composition of (24) wherein the metallic soaps are selected from the group of organometallic reagents consisting of aluminum octoate, aluminum palmitate, aluminum stearate, aluminum distearate, aluminum tristearate, barium stearate, calcium stearate, lead stearate, magnesium stearate, zinc palmitate, and zinc stearate;

(26) the ink jet ink composition of (24) wherein the oxyaluminum acylates are selected from the group of organometallic reagents consisting of oxyaluminum octoate and oxyaluminum stearate;

(27) the ink jet ink composition of (24) wherein the alkoxy titanates are selected from the group of organometallic reagents consisting of titanium (IV) ethoxide, titanium (IV) butoxide, and titanium (IV) isoproxide.

(28) the ink jet ink composition of (24) wherein the monoalkoxy titanates are selected from the group of organometallic reagents consisting of isopropyl triisostearoyl titanate and isopropyl tri(dodecyl)benzenesulfonyl titanate;

(29) the ink jet ink composition of claim 24 wherein the chelated titanium agents are selected from the group of organometallic reagents consisting of di(cumyl)phenyl oxoethylene titanate and di(butyl, methyl)pyrophosphato ethylene titanate;

(30) the ink jet ink composition of (24) wherein the coordinate titanate is tetraisopropyldi(dioctyl)phosphito titanate;

(31) the ink jet ink composition of (24) wherein the alkoxy zirconate is zirconium (IV) butoxide;

(32) the ink jet ink composition of (24) wherein the neoalkoxy zirconates are selected from the group of organometallic reagents consisting of neopentyl(diallyl)oxy trineodecanoyl zirconate and neopentyl(diallyl)oxy tri (dodecyl)benzene-sulfonyl zirconate;

(33) the ink jet ink composition of (24) wherein the cycloheteroatom zirconates are selected from the group of organometallic reagents consisting of cyclo(dioctyl) pyrophosphato dioctyl zirconate and cyclo[dineopentyl (diallyl)]pyrophosphato dineopentyl(diallyl) zirconate;

(34) the ink jet ink composition of (23) wherein the crosslinking agent is a member of the group of reagents selected from alkoxy reagents, chelated reagents, and metallocene reagents based on a member of the group of elements selected from antimony, copper, gallium, germanium, indium, iron, lanthanum, manganese, nickel, niobium, selenium, tin, thallium, and zinc;

(35) the ink jet ink composition of (23) wherein the crosslinking agent is a silicon based coupling agent selected from a member of the group consisting of silanes and siloxanes;

(36) the ink jet ink composition of (2) further comprising a member of the group consisting of wax, polymer, antioxidant, biocide, corrosion inhibitor, and a combination thereof;

(37) the ink jet ink composition of claim 36 wherein the wax is selected from the group consisting of petroleum wax, plant wax, animal wax, synthetic hydrocarbon wax higher fatty acid, higher alcohol, and a derivative thereof;

(38) the ink jet ink composition of (37) wherein the petroleum wax is a member of the group consisting of paraffin wax and micro crystalline wax;

(39) the ink jet ink composition of (37) wherein the plant wax is a member of the group consisting of candelilla wax and carnuba wax;

(40) the ink jet ink composition of (37) wherein the animal wax is a member of the group consisting of bees wax and lanolin;

(41) the ink jet ink composition of (37) wherein the synthetic hydrocarbon wax is a member of the group consisting of a Fisher-Tropsch wax and a polyethylene wax;

(42) the ink jet ink composition of (37) wherein the higher fatty acid is a member of the group consisting of stearic acid and lauric acid;

(43) the ink jet ink composition of (37) wherein the higher alcohol is selected from a member of the group consisting of stearyl alcohol and 12-hydroxystearic acid;

(44) the ink jet ink composition of (36) wherein the polymer is a member of the group consisting of alkyd resins, amides, acrylic polymers, benzoate esters, citrate plasticizers, cumarone-indene resins, dimer fatty acids, epoxy resins, fatty acids, ketone resins, maleate plasticizers, long chain alcohols, olefin resins, petroleum resins, phenolic resins, phthalate plasticizers, polyesters, polyvinyl alcohol resins, rosins, styrene resins, sulfones, sulfonamides, terpene resins, urethanes, vinyl resins, and derivatives and combinations thereof;

(45) the ink jet ink composition of (44) wherein the polymer is characterized by a melting point from about 40 to about 200° C. and a surface tension from about 20 to about 70 dynes/cm;

(46) the ink jet ink composition of (45) wherein the polymer is characterized by a melting point from about 60 to about 140° C. and a surface tension from about 30 to about 60 dynes/cm;

(47) the ink jet ink composition of (36) wherein the antioxidant is present in an amount from about 0.1% to about 1.0%, based on the weight of the ink composition;

(48) the ink jet ink composition of (36) wherein the biocide is present in an amount from about 0.01% to about 5.0%, based on the weight of the ink composition; and

(49) the ink jet ink composition of (36) wherein the corrosion inhibitor is present in an amount from about 0.1% to about 5.0%, based on the weight of the ink composition.

A further embodiment of the invention disclosed herein is:

(50) A method of printing comprising applying an ink jet ink composition comprising a colorant and a reversibly-crosslinked-polymer on a substrate with a recording device;

(51) the method of (50) wherein the application of the ink composition on the substrate is conducted by thermally melting the ink at a temperature above ambient temperature;

(52) the method of (51) wherein the application of the ink is selected from the group consisting of hot melt ink jet and hot melt gravure;

(53) the method of (50) wherein the substrate is selected from the group consisting of porous substrates and nonporous substrates;

(54) the method of (53) wherein the porous substrate is selected from the group consisting of wood, paper, and textile;

(55) the method of (53) wherein the nonporous substrate is selected from the group consisting of glass, metal, and synthetic polymer film;

(56) the method of (55) wherein the metal is aluminum; and

(57) the method of (50) wherein the recording device is a piezo ink jet printer.

Modifications to this invention will occur to those skilled in this art. Therefore, it is to be understood that this invention is not necessarily limited to the particular embodiments disclosed; rather, it is intended to cover all modifications which are within the true spirit and scope of this invention, as disclosed and claimed herein.

What is claimed is:

1. A phase change ink jet ink composition comprising a colorant and a reversibly-crosslinked-polymer comprising a polymer selected from the group consisting of alginic acid, carboxymethyl cellulose, pectinic acid, rosin esters, lignosulfonates, nitrocellulose, alcohol-soluble polysaccharides, polyacrylamide, polyacrylic acid, polyethylene oxide, polyethylene glycol, polymethacrylic acid, polyitaconic acid, polymaleic acid, polyvinyl alcohol, polyvinyl methyl ether, styrene/acrylic acid, ethylene/vinyl acetate, acrylic acid/N-vinyl pyrrolidinone, and vinylnaphthalene/itaconate, wherein said polymer is characterized by having chemically attached thereto a crosslinking agent selected from the group consisting of aluminum octoate, aluminum palmitate, aluminum stearate, aluminum distearate, aluminum tristearate, barium stearate, calcium stearate, lead stearate, magnesium stearate, zinc palmitate, zinc stearate, oxyaluminum octoate oxyaluminum stearate, titanium (IV) ethoxide, titanium (IV) butoxide, titanium (IV) isoproxide, isopropyl triisostearoyl titanate, isopropyl tri (dodecyl)benzenesulfonyl titanate, di(cumyl)phenyl oxoethylene titanate, di(butyl, methyl)pyrophosphato ethylene titanate, tetraisopropyldi(dioctyl)phosphito titanate, zirconium (IV) butoxide, dineopentyl(diallyl)oxy neopentyl (diallyl)oxy trineodecanoyl zirconate, neopentyl(diallyl)oxy tri(dodecyl)benzene-sulfonyl zirconate, cyclo(dioctyl) pyrophosphato dioctyl zirconate, cyclo[(dineopentyl (diallyl)]pyrophosphato dineopentyl(diallyl) zirconate, and silicon-based coupling agents selected from the group consisting of silanes and siloxanes, and wherein the polymer is further characterized by at least one functional group capable of reacting reversibly with the crosslinking agent, said reactive functional groups being selected from the group consisting of alcohols, alkenes, alkanes, aldehydes, amines, azides, aziridines, carboxylic acids, epoxides, nitriles, phenols, phosphates, phosphites, and phosphines.

2. The ink jet ink composition of claim 1 wherein the colorant is a member of the group of colorants selected from pigments, dyes, metals, metal oxides, and combinations thereof.

3. The ink jet ink composition of claim 2 wherein the pigment is selected from the group of organic and inorganic water-insoluble colorants and combinations thereof.

4. The ink jet ink composition of claim 3 wherein the pigment is selected from the group of pigments consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, and C.I. Vat Blue 6.

5. The ink jet ink composition of claim 4 wherein the pigment is present in an amount of from about 0.1 to about 30 wt % and is characterized by a particle size of from about 0.1 to about 100 microns in diameter.

6. The ink jet ink composition of claim 5 wherein the pigment is present in an amount of from about 2 to about 10 wt % and is characterized by a particle size of from about 0.01 to about 10 microns in diameter.

7. The ink jet ink composition of claim 6 wherein the pigment is characterized by a particle size from about 0.01 to about 5 microns in diameter.

8. The ink jet ink composition of claim 2 wherein the dye is selected from the group of dyes consisting of basic, acid, and direct dyes.

9. The ink jet ink compositions of claim 2 wherein the dye is a reactive dye.

10. The ink jet ink composition of claim 2 wherein the dye is present in an amount of from about 0.1 to about 30 wt %.

11. The ink jet ink composition of claim 10 wherein the dye is present in an amount of from about 2 to about 10 wt %.

12. The ink jet ink composition of claim 2 wherein the metals and metal oxides are selected from the group consisting of silica, alumina, titania, and finely divided copper.

13. The ink jet ink composition of claim 1 wherein the reversibly-crosslinked-polymer is present in an amount to provide an amount of the attached crosslinking agent from about 0.01% to about 30%, based on the weight of the polymer in gel form and wherein the polymer is characterized by an acid number from about 10 to about 300, a weight average molecular weight from about 500 to about 250,000, a softening point from about 0 to about 150° C., and a glass transition temperature from about −25 to 180° C.

14. The ink jet ink composition of claim 13 wherein the polymer is characterized by an acid number from about 20 to about 80, a weight average molecular weight from about 2,000 to about 35,000, a softening point from about 40 to 90° C., and a glass transition temperature from about 25 to about 80° C.

15. The ink jet ink composition of claim 1 wherein the reversibly-crosslinked-polymer is prepared by a polymerization method selected from the group consisting of solution polymerization, emulsion polymerization, suspension polymerization, and bulk polymerization.

16. The ink jet composition of claim 1 further comprising a member of the group consisting of a wax, a second polymer, an antioxidant, a biocide, a corrosion inhibitor, and a combination thereof.

17. The ink jet ink composition of claim 16 wherein the wax is selected from the group consisting of petroleum wax, plant wax, animal wax, synthetic hydrocarbon wax, higher fatty acid, higher alcohol, and a derivative thereof.

18. The ink jet ink composition of claim 17 wherein the petroleum wax is a member of the group consisting of paraffin wax and micro crystalline wax.

19. The ink jet ink composition of claim 17 wherein the plant wax is a member of the group consisting of candelilla wax and carnuba wax.

20. The ink jet ink composition of claim 17 wherein the animal wax is a member of the group consisting of bees wax and lanolin.

21. The ink jet ink composition of claim 17 wherein the synthetic hydrocarbon wax is a member of the group consisting of a Fisher-Tropsch wax and a polyethylene wax.

22. The ink jet ink composition of claim 17 wherein the higher fatty acid is a member of the group consisting of stearic acid and lauric acid.

23. The ink jet ink composition of claim 17 wherein the higher alcohol is selected from a member of the group consisting of stearyl alcohol and 12-hydroxystearic acid.

24. The ink jet ink composition of claim 16 wherein the polymer is a member of the group consisting of alkyd resins, amides, acrylic polymers, benzoate esters, citrate plasticizers, cumarone-indene resins, dimer fatty acids, epoxy resins, fatty acids, ketone resins, maleate plasticizers, long chain alcohols, olefin resins, petroleum resins, phenolic resins, phthalate plasticizers, polyesters, polyvinyl alcohol resins, rosins, styrene resins, sulfones, sulfonamides, terpene resins, urethanes, vinyl resins, and derivatives and combinations thereof.

25. The ink jet ink composition of claim 24 wherein the polymer is characterized by a melting point from about 40 to about 200° C. and a surface tension from about 20 to about 70 dynes/cm.

26. The ink jet ink composition of claim 25 wherein the polymer is characterized by a melting point from about 60 to about 140° C. and a surface tension from about 30 to about 60 dynes/cm.

27. The ink jet ink composition of claim 16 wherein the antioxidant is present in an amount from about 0.1% to about 1.0%, based on the weight of the ink composition.

28. The ink jet ink composition of claim 16 wherein the biocide is present in an amount from about 0.01% to about 5.0%, based on the weight of the ink composition.

29. The ink jet ink composition of claim 16 wherein the corrosion inhibitor is present in an amount from about 0.1% to about 5.0%, based on the weight of the ink composition.

30. A method of printing comprising applying an ink jet ink composition comprising a colorant and a reversibly-crosslinked-polymer on a substrate with a recording device.

31. The method of claim 30 wherein the application of the ink composition on the substrate is conducted by thermally melting the ink at a temperature above ambient temperature.

32. The method of claim 31 wherein the application of the ink is selected from the group consisting of hot melt ink jet and hot melt gravure.

33. The method of claim 30 wherein the substrate is selected from the group consisting of porous substrates and nonporous substrates.

34. The method of claim 33 wherein the porous substrate is selected from the group consisting of wood, paper, and textile.

35. The method of claim 33 wherein the nonporous substrate is selected from the group consisting of glass, metal, and synthetic polymer film.

36. The method of claim 35 wherein the metal is aluminum.

37. The method of claim 30 wherein the recording device is a piezo ink jet printer.

* * * * *